United States Patent
Yoon et al.

(10) Patent No.: US 11,664,556 B2
(45) Date of Patent: May 30, 2023

(54) SECONDARY BATTERY COMPRISING A DEFORMED GASKET AND METHOD FOR MANUFACTURING THE SAME

(71) Applicant: LG Chem, Ltd., Seoul (KR)

(72) Inventors: Dong Sik Yoon, Daejeon (KR); Ju Bin Kim, Daejeon (KR); Byung Soo Kim, Daejeon (KR)

(73) Assignee: LG Energy Solution, Ltd.

( * ) Notice: Subject to any disclaimer, the term of this patent is extended or adjusted under 35 U.S.C. 154(b) by 272 days.

(21) Appl. No.: 17/056,998

(22) PCT Filed: Jul. 3, 2019

(86) PCT No.: PCT/KR2019/008155
§ 371 (c)(1),
(2) Date: Nov. 19, 2020

(87) PCT Pub. No.: WO2020/009477
PCT Pub. Date: Jan. 9, 2020

(65) Prior Publication Data
US 2021/0203034 A1 Jul. 1, 2021

(30) Foreign Application Priority Data
Jul. 6, 2018 (KR) .................. 10-2018-0078966

(51) Int. Cl.
*H01M 50/325* (2021.01)
*H01M 50/186* (2021.01)
(Continued)

(52) U.S. Cl.
CPC ..... *H01M 50/325* (2021.01); *H01M 10/0427* (2013.01); *H01M 50/109* (2021.01);
(Continued)

(58) Field of Classification Search
CPC ............. H01M 50/325; H01M 50/186; H01M 50/109; H01M 50/193; H01M 50/153; H01M 10/0427
See application file for complete search history.

(56) References Cited

U.S. PATENT DOCUMENTS

| | | | |
|---|---|---|---|
| 3,597,282 | A | 8/1971 | Farley, Jr. |
| 4,263,380 | A | 4/1981 | Riedl |

(Continued)

FOREIGN PATENT DOCUMENTS

| | | |
|---|---|---|
| CN | 2423661 Y | 3/2001 |
| CN | 2859832 Y | 1/2007 |

(Continued)

OTHER PUBLICATIONS

International Search Report for Application No. PCT/KR2019/008155 dated Oct. 11, 2019, 2 pages.

(Continued)

*Primary Examiner* — Christopher P Domone
*Assistant Examiner* — Kimberly Wyluda
(74) *Attorney, Agent, or Firm* — Lerner David LLP

(57) ABSTRACT

A button-type secondary battery of the present invention comprises: a first can having a first side surface extending vertically from a circumference of a first base surface; a second can having a second side surface extending vertically from a second base surface; and a gasket disposed between the first side surface and the second side surface when the first can and the second can are coupled to each other. The second base surface has a greater diameter than the first base surface, and the first can and the second can are coupled to each other with the first side surface inserted inside the second side surface. The first and second cans are fixed together by deforming the gasket so as to extend into a vent hole punched in the second side surface of the second can.

(Continued)

A method for manufacturing the button-type secondary battery is also provided.

13 Claims, 6 Drawing Sheets

(51) Int. Cl.
 *H01M 50/109* (2021.01)
 *H01M 50/153* (2021.01)
 *H01M 50/193* (2021.01)
 *H01M 10/04* (2006.01)
 *H01M 50/147* (2021.01)
 *H01M 50/184* (2021.01)

(52) U.S. Cl.
 CPC ....... *H01M 50/147* (2021.01); *H01M 50/153* (2021.01); *H01M 50/184* (2021.01); *H01M 50/186* (2021.01); *H01M 50/193* (2021.01)

(56) References Cited

U.S. PATENT DOCUMENTS

| | | |
|---|---|---|
| 2008/0076024 A1 | 3/2008 | Janmey |
| 2010/0291432 A1 | 11/2010 | Kim |
| 2011/0200871 A1 | 8/2011 | Pytlik et al. |
| 2012/0015224 A1 | 1/2012 | Pytlik et al. |
| 2012/0028110 A1 | 2/2012 | Brenner |
| 2015/0243938 A1 | 8/2015 | Kim et al. |
| 2019/0252648 A1 | 8/2019 | Koyama et al. |
| 2019/0355940 A1 | 11/2019 | Satou et al. |

FOREIGN PATENT DOCUMENTS

| | | |
|---|---|---|
| CN | 201708213 U | 1/2011 |
| DE | 2842697 B1 | 12/1979 |
| JP | H0696774 A | 4/1994 |
| JP | H06150895 A | 5/1994 |
| JP | H10134826 A | 5/1998 |
| JP | 2000138044 A | 5/2000 |
| JP | 2003051293 A | 2/2003 |
| JP | 2003123830 A | 4/2003 |
| JP | 2003178765 A | 6/2003 |
| JP | 2005011748 A | 1/2005 |
| JP | 2005347104 A | 12/2005 |
| JP | 2006040596 A | 2/2006 |
| JP | 2009218135 A | 9/2009 |
| JP | 2010211944 A | 9/2010 |
| JP | 2011086760 A | 4/2011 |
| JP | 201411150 A | 1/2014 |
| JP | 2015527723 A | 9/2015 |
| JP | 2016152231 A | 8/2016 |
| JP | 2017015659 A | 1/2017 |
| JP | 2017168237 A | 9/2017 |
| JP | 2017168439 A | 9/2017 |
| KR | 20110009097 A | 1/2011 |
| KR | 20110124269 A | 11/2011 |
| KR | 20120007032 A | 1/2012 |
| KR | 20160008270 A | 1/2016 |
| KR | 20160088574 A | 7/2016 |
| KR | 20160004353 U | 12/2016 |
| WO | 2005048390 A1 | 5/2005 |
| WO | 2018124152 A1 | 7/2018 |

OTHER PUBLICATIONS

Search Report dated Jun. 22, 2022 from the Office Action for Chinese Application No. 201980033582 4 dated Jun. 29, 2022, 5 pages.

Extended European Search Report including Written Opinion for Application No. 19831297.7 dated May 20, 2021, 8 pages.

SECONDARY BATTERY COMPRISING A DEFORMED GASKET AND METHOD FOR MANUFACTURING THE SAME

CROSS-REFERENCE TO RELATED APPLICATION

The present application is a national phase entry under 35 U.S.C. § 371 of International Application No. PCT/KR2019/008155 filed Jul. 3, 2019, which claims priority from Korean Patent Application No. 10-2018-0078966, filed on Jul. 6, 2018, the disclosures of which are hereby incorporated by reference in their entirety.

TECHNICAL FIELD

The present invention relates to a secondary battery and a method for manufacturing the same, and more particularly, to a button-type secondary battery in which an internal space increases to mount a larger electrode assembly, thereby increasing in capacity, and a method for manufacturing the secondary battery.

BACKGROUND ART

In general, a button-type battery commonly used as a coin-type battery or a button-type battery has a thin button shape and is widely used in various devices such as remote controllers, clocks, toys, computer parts, and the like.

Such a button-type battery is mainly manufactured as a non-rechargeable primary battery, but is also widely manufactured as a secondary battery that is chargeable and dischargeable as miniaturized devices are developed. Also, the button-type secondary battery also has a structure in which an electrode assembly and an electrolyte are embedded in a case to repeatedly perform charging and discharging, like the button-type secondary battery or the cylindrical or pouch-type secondary battery.

FIG. 1 is a cross-sectional view illustrating a button-type secondary battery according to the related art. As illustrated in FIG. 1, an outer appearance (a shape in which a first can and a second can are coupled to each other) of the button-type secondary battery has a flat cylindrical shape similar to a schale or bowl. When an electrode assembly 4 is seated in the first can 1 with an upper side opened, peripheral components (not shown) of the electrode assembly 4 are mounted, and an electrolyte (comprising a liquid electrolyte) is injected, and then, the second can 2 covers the upper side of the first can 1.

Here, clamps 1a and 2a to be fitted to each other are provided in an upper edge portion of a side surface of the first can 1 and an edge portion of the second can 2, respectively. That is, the edge portions of the first can 1 and the second can 2 are bent to form the clamps 1a and 2a so that the edge portions are engaged with and coupled to each other when the second can 2 is placed on the electrode assembly 4. Here, in a state in which each of the clamps 1a and 2a is elastically deformed by a pressure generated when the second can 2 is inserted, when the second can 2 is completely inserted, the clamps 1a and 2a may be elastically restored to be coupled to each other as illustrated in the drawing.

Also, a gasket 3 made of a rubber material may be inserted between the clamps 1a and 2a to seal the inside.

DISCLOSURE OF THE INVENTION

Technical Problem

In the manner of coupling using the clamps as described above, since a height of the internal space between the first can 1 and the second can 2 is less than the total height (a height from the lowest end to the highest end of the battery) to limit a size of the electrode assembly 4, it is difficult to increase in capacity of the battery relative to the total volume of the battery.

Therefore, a main object of the present invention is to provide a button-type secondary battery in which an internal space is larger than that of the related art, in order to secure increased capacity (in which a larger electrode assembly is capable of being mounted) with respect to the same volume, and a method for manufacturing the secondary battery.

Technical Solution

The present invention for achieving the above object provides a button-type secondary battery, which more increases in internal space, and a method for manufacturing the secondary battery.

A button-type secondary battery according to the present invention comprises: a first can of which a first side surface is vertically disposed along a circumference of a first base surface; a second can which has a second base surface having a diameter greater than that of the first base surface of the first can and of which a second side surface is vertically disposed along the second base surface, wherein a vent hole is punched in the second side surface; and a gasket disposed between the first side surface and the second side surface when the first can and the second can are coupled to each other, wherein the first can and the second can are coupled to each other so that the first side surface is inserted inside the second side surface and are deformed so that the gasket is fitted into the vent hole, thereby fixing the first can and the second can.

In the present invention, the first side surface of the first can may be disposed to face an upper side from the first base surface, and the second side surface of the second can may be disposed to face a lower side from the base surface so that the second can is coupled to cover an upper side of the first can.

Also, the gasket may be deformed to a size corresponding to a difference between a pressure inside a space defined by the first can and the second can and a pressure outside the first can and the second can.

In an embodiment of the present invention, at least two or more vent holes may be defined along a circumference of the side surface of the second can.

For example, the second can may have a circular plate shape on a plane, and the vent holes may be disposed in pairs to be symmetric to each other with respect to a center of the circular plate.

As another configuration, the second can may have a circular plate shape on a plane, and the vent holes may be disposed to be denser in a specific region than other regions with respect to a circumference of the circular plate shape.

Furthermore, a method for manufacturing a button-type secondary battery according to the present invention, in which a first can of which a first side surface is vertically disposed along a circumference of a first base surface and a second can which has a second base surface having a diameter greater than that of the first base surface of the first can and of which a second side surface is vertically disposed along the second base surface are coupled to each other, comprises: a step of preparing the first can; a step of preparing the second can; a punching step in which a vent hole punched in a side surface of the second can; a coupling step in which a gasket is disposed between the first side surface of the first can and the second side surface of the second can (after an electrode assembly and an electrolyte are mounted), and the first can and the second can are coupled to allow the gasket to cover the vent hole; and a fixing step in which the gasket is deformed to allow the gasket to be fitted into the vent hole so as to fix the first can and the second can.

In the fixing step, when a negative pressure is applied to the vent hole from the outside of the gasket, the gasket may be deformed to be fitted into the vent hole.

In the present invention, the method may further comprise a temporarily fixing step in which the first can and the second can are fixed between the negative pressure is applied to the vent hole.

Also, the negative pressure may be applied in a state in which the gasket is attached to the side surface of the first can.

Furthermore, the negative pressure is applied in a state in which a partial region of the gasket to be deformed is attached with adhesion force lower than that of each of other regions or is not attached (thereby preventing the side surface of the first can from being deformed).

Also, a partial region of the gasket to be deformed has a thickness different from that of each of other regions (so that the negative pressure is concentrated to more easily cause the deformation).

In the punching step, at least two or more vent holes may be formed along a circumference of the side surface of the second can.

Advantageous Effects

According to the present invention having the configuration as described above, since the coupling point of the first can and the second can moves from the upper side to the side surface of the battery, the height of the internal space relative to the total height may increase, and thus, an electrode assembly having the larger capacity may be mounted.

According to the present invention, since the gasket is deformed to be fitted into the vent hole so as to fix the first can and the second can, each of the first can and the second can may have a smooth surface.

Since the gasket is deformed to a size corresponding to the difference between the pressure inside the space defined by the first can and the second can and the pressure outside the first can and the second can, the physical pressure causing the stress and/or the unnecessary deformation may not be applied to the first can and the second can.

Since at least two or more vent holes are formed, the coupling force may be adjusted according to the required specification.

Furthermore, since the vent holes are disposed to be more dense in a specific region, the coupling force at the specific position to which the electrode lead is additionally attached may be improved.

Also, in the state in which the partial region of the gasket to be deformed is attached with adhesive force lower than that of each of the other regions in which it is not attached, the negative pressure may be applied to prevent the side surface of the first can from being deformed.

Also, the partial region of the gasket to be deformed may have a thickness greater than that of each of the other regions and thus may be more easily deformed.

MODE FOR CARRYING OUT THE INVENTION

Figure 1:
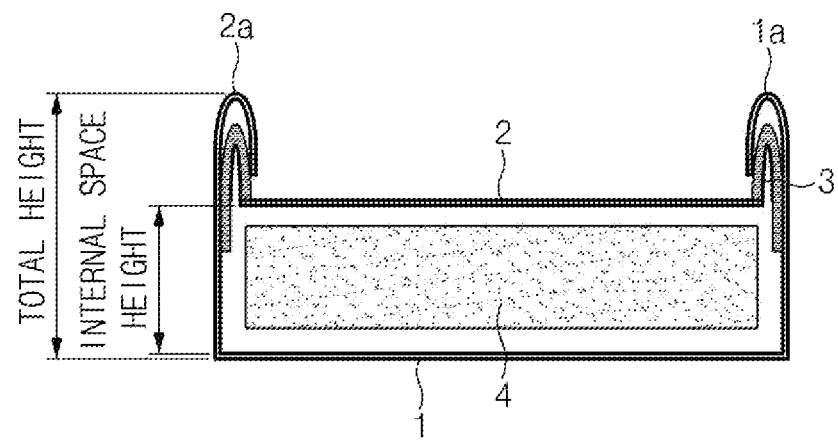
FIG. 1 is a simplified longitudinal cross-sectional view of a button-type secondary battery according to a related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted by their ordinary meanings or dictionary-based meanings, but rather should be interpreted based on meanings and concepts conforming to the scope of the present invention on the basis of the principle that an inventor can properly define the concept of a term to describe and explain his or her invention in the best ways.

The present invention provides a button-type secondary battery having an internal space greater than that of the structure according to the related art and a method for manufacturing the secondary battery. Hereinafter, embodiments of the present invention will be described in more detail with reference to accompanying drawings.

Embodiment 1

Embodiment 1 of the present invention provides a button-type secondary battery having an internal space greater than that of the structure according to the related art. The secondary battery of the present invention has a feature in which a gasket 30 disposed between a first can 10 and a second can 20 is fitted into and fixed to a vent hole 23 defined in the second can 20.

Figure 2:
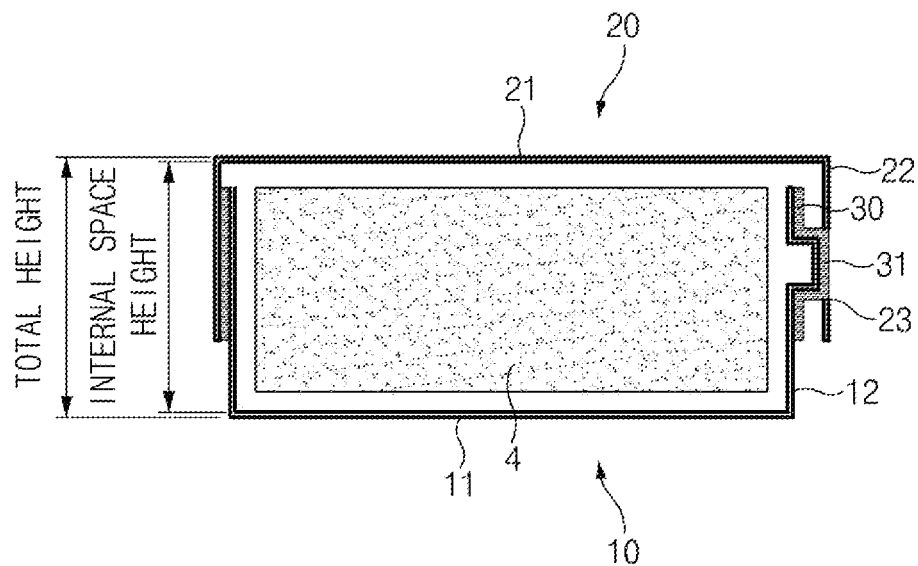
FIG. 2 is a simplified longitudinal cross-sectional view of a button-type secondary battery according to an embodiment of the present invention.

Referring to FIG. 2, the first can 10 has a circular first base surface 11 having a predetermined size, and a first side surface 12 is vertically disposed along a circumference of the first base surface 11. Also, the second can 20 has a circular second base surface 21 having a diameter greater than that of the first base surface 11 of the first can 10, and a second side surface 22 is vertically disposed along a circumference of the second base surface 21. In addition, a vent hole 23 is punched in the second side surface 22. That is, each of the first can 10 and the second can 20 has a flat cylindrical shape similar to a schale or bowl. Here, the second can 20 has an area slightly greater than that of the first can 10, and the vent hole 23 is additionally punched in the second can 20.

In this embodiment, the first side surface 12 of the first can 10 faces an upper side from the first base surface 11, and the second side surface 22 of the second can 20 faces a lower side from the second base surface 21 so that the second can 20 covers an upper side of the first can 10. Here, the first can 10 is coupled to the second can 20 in a state in which the gasket 30 having a ring shape) is fitted into an outer circumferential surface of the first side surface 12. Thus, when the first can 10 is coupled to the second can 20, the gasket 30 is disposed between the first side surface 12 and the second side surface 22. For reference, here, the gasket 30 may be in a state in which a portion or the whole of the gasket 30 is attached to the first side surface 12.

Also, in a state in which the first side surface 12 is inserted inside the second side surface 22, the gasket 30 coupled to the outer circumferential surface of the first side surface 12 faces an inner circumferential surface of the second side surface 22. Here, since the gasket 30 is exposed through the vent hole 23 defined in the second side surface, when a negative pressure is applied to the vent hole 23, a portion 31 of the gasket 30 is deformed to be fitted into the vent hole 23.

That is, the gasket 30 may be deformed to a size corresponding to a difference between a pressure inside a space defined by the first can 10 and the second can 20 and a pressure outside the first can 10 and the second can 20, so as to fix the first can 10 and the second can 20.

Figure 5:
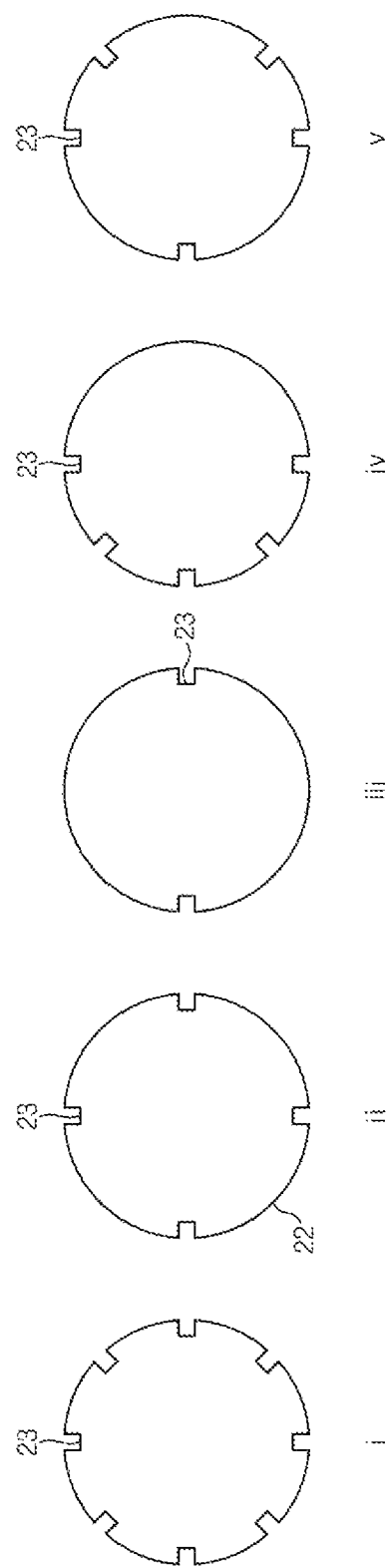
FIG. 5 is a bottom view illustrating regions of the second can in which vent holes are punched.

Furthermore, in an embodiment of the present invention, although one vent hole 23 is illustrated in the drawings, at least two or more vent holes may be defined along a circumference of the side surface 22 of the second can 20. For example, the second can 20 has a circular plate shape on a plane. As illustrated in FIG. 5, an even number of vent holes 23 may be provided, and the vent holes 23 may be disposed in pairs so as to be symmetric with one another with respect to a center of the circular plate (see FIGS. 5*i*, 5*ii*, and 5*iii*). For reference, FIG. 5 illustrates positions at which the vent holes 23 are defined when the second can 20 is viewed upward or downward, i.e., illustrates a transverse cross-sectional view of the second can at the portions in which the vent holes are defined.

In another configuration, the second can 20 has a circular plate shape on the plane. Here, the vent holes 23 may be disposed so as to be denser in a specific region than other regions with respect to a circumference of the circular plate shape (see FIGS. 5*iv* and 5*v*).

Embodiment 2

Furthermore, as Embodiment 2 of the present invention, a method for manufacturing a button-type secondary battery having the above-described configuration is provided.

The manufacturing method according to the present invention comprises a step of preparing (providing) a first can 10 in which a first side surface 12 is vertically formed along a circumference of a first base surface 11 and a step of preparing (providing) a second can 20 which has a second base surface 21 having a diameter greater than that of the first base surface 11 and in which a second side surface 22 is vertically formed along a circumference of the second base surface 21.

Since the first can 10 and the second can 20 are provided through a known molding method according to the related art, detailed description thereof will be omitted. Also, in the provided second can 20, a vent hole 23 having a predetermined size is punched in predetermined numbers in the second side surface 22. The punching of the vent hole 23 may be performed through a known method such as punching or drilling according to a material of the second can 20.

Also, after an electrode assembly is seated in the first can 10, and an electrolyte or the like is additionally mounted in the state in which the first side surface is placed to face an upper side, the second can 20 covers an upper side of the first can 10 in a state in which the second side surface is placed to face a lower side. Here, before the second can 20 covers the first can 10, a gasket 30 is coupled to the first can 10 so as to be fixed to an outer circumferential surface of the first side surface 12. The gasket 30 may be coupled to the first can 10 before the electrode assembly is seated or may be coupled to the first can 10 after the electrode assembly is seated. Alternatively, the gasket 30 may be attached to the first side surface 12 by using an adhesive or through a method such as thermal fusion.

Thus, when the first can 10 and the second can 20 are coupled to each other, the gasket 30 is disposed between the first side surface 12 and the second side surface 22, and the gasket 30 faces the vent hole 23 (the gasket is exposed to the outside through the vent hole when viewed from the outside of the vent hole).

Figure 3A:
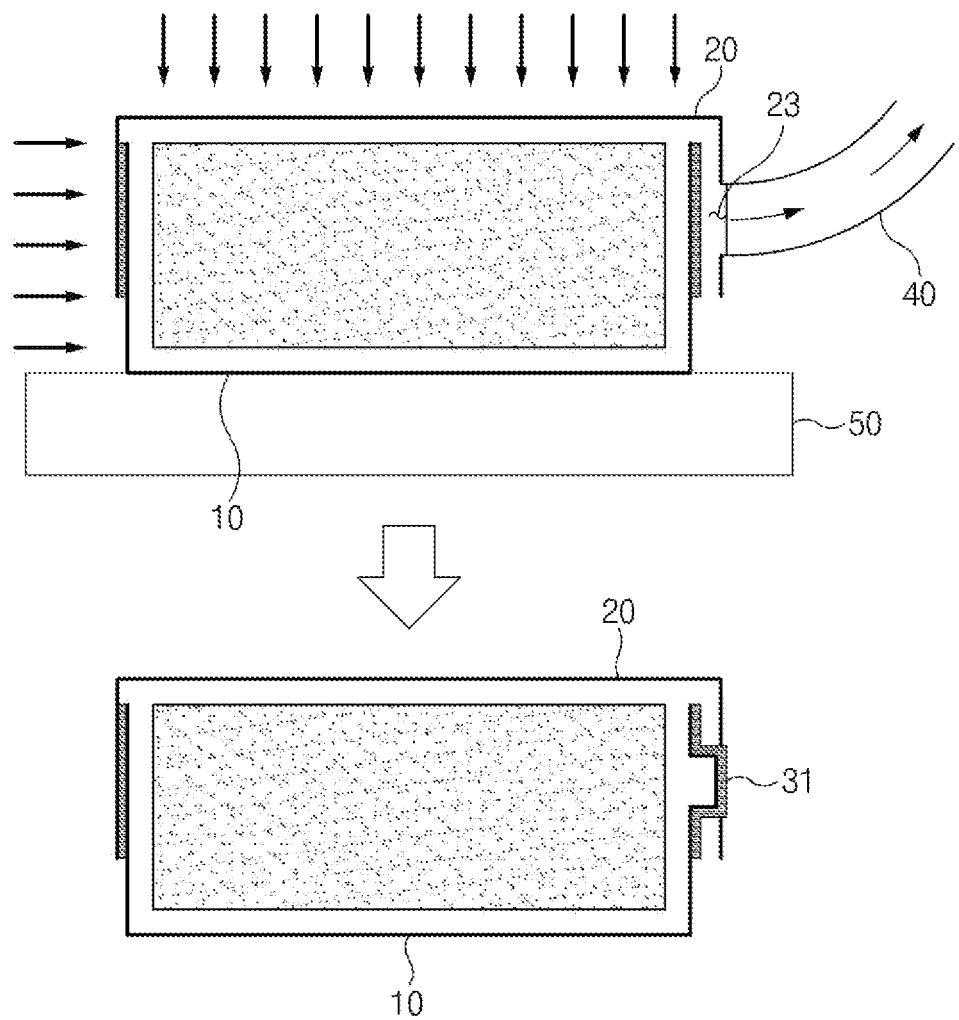
FIG. 3a is a cross-sectional view illustrating a state before and after a negative pressure is applied when a first can and a second can are seated, i.e., a state in which a side surface of the first can is deformed together with the gasket.
Figure 3B:
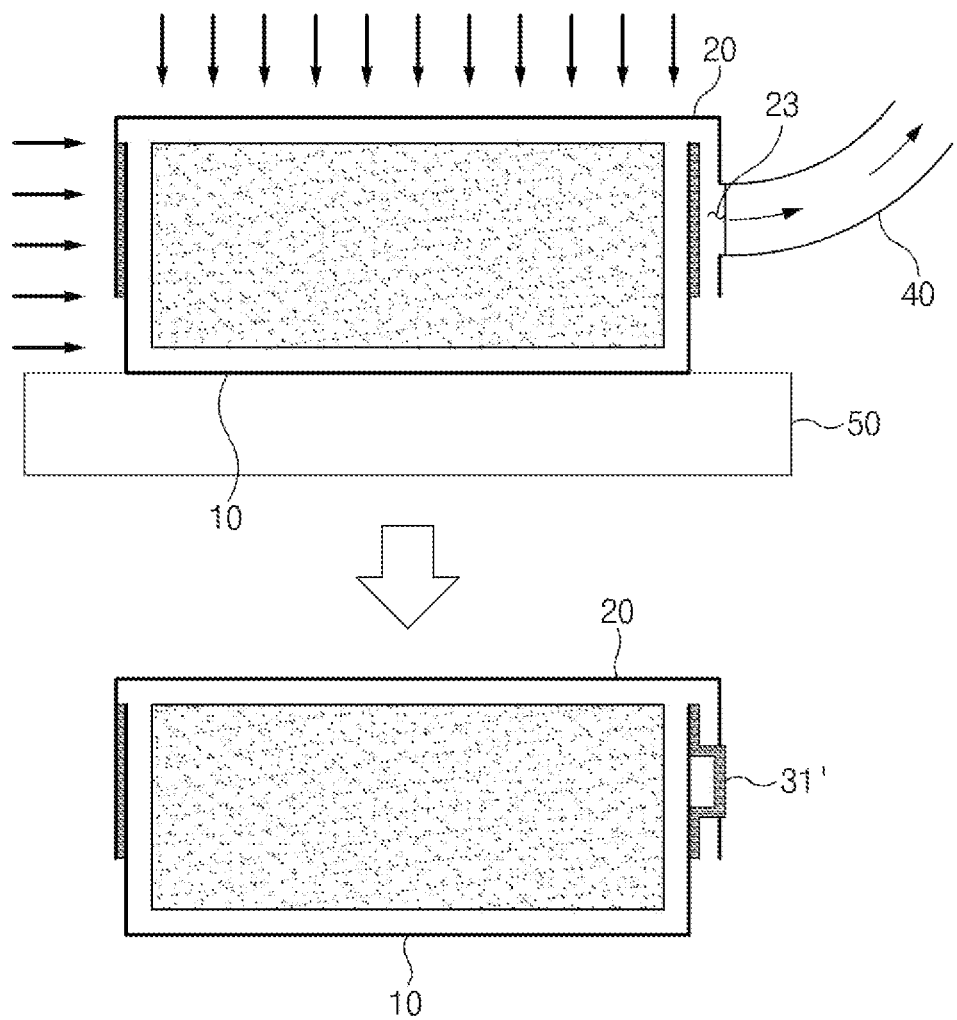
FIG. 3b is a cross-sectional view illustrating a state before and after the negative pressure is applied when the first can and the second can are seated, i.e., a state in which only the gasket is deformed.

Also, the gasket 30 may be deformed to fix the first can 10 and the second can 20. In an embodiment of the present invention, as illustrated in FIGS. 3*a* and 3*b*, when a vacuum hose 40 is connected to the vent hole 23 of the second can 20 while a pressure is vertically and horizontally applied to fix the first can 10 and the second can 20 (or the first can 10 and the second can 20 are fitted into a fixed position or coupled to the exclusive bracket so as to be limited in movement) in a state in which the first can 10 and the second can 20 are placed on a flat surface plate 50, a negative pressure is generated in the first can 10 and the second can 20 to deform the first can 10 and the second can 20.

Here, since the inner space of the first can 10 and the second can 20 is filled with the electrode assembly and the electrolyte, the first can 10 and the second can 20 may be supported even though the negative pressure is applied. On the other hand, since a space between the first side surface 12 and the second side surface 22 is a point at which the negative pressure is applied and thus has relatively weak supporting force, deformation may occur. When the deformation occurs by the negative pressure, as illustrated in FIG. 3*a*, a portion of the first side surface 12 may be deformed together with the gasket 30. Alternatively, as illustrated in FIG. 3*b*, only the gasket 30 may be deformed without deforming the first side surface 12.

The above-described difference may be determined by the magnitude of the applied negative pressure, an area to which the negative pressure is applied, adhesion between the gasket 30 and the first side surface 12, a material of the first can 10, and the like and also may be differently designed according to a required design specification. Furthermore, when a portion of the first side surface 12 is deformed as illustrated in FIG. 3a, a groove may be locally formed so that the (plastic or elastic) deformation increases in the first side surface 12. Particularly, the groove may be locally formed at a portion of the first side surface 12 at which bending occurs. Also, the gasket 30 may adhere to the first side surface with greater adhesive force at a portion 31 of the gasket 30 to which the pressure is concentrated to cause the deformation of the gasket 30. On the other hand, when only the gasket is deformed without the deformation of the first side surface 12 as illustrated in FIG. 3b, it is preferable that the adhesion force between the first side surface 12 and the gasket 30 is less than that of other points at a specific portion 31' at which the deformation of the gasket 30 occurs.

Figure 4A:
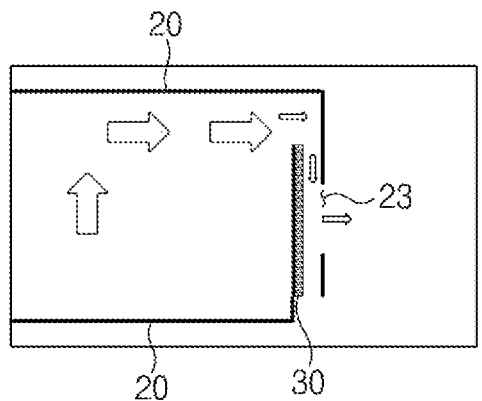
FIG. 4a is a cross-sectional view illustrating a path through which inner air is discharged when the negative pressure is applied.

As illustrated in FIG. 4a, a path through which air moves between the first side surface 12 and the second side surface 22 may be narrower than other portions within the first can 10 and the second can 20. However, if the applied negative pressure is low, or the space between the first side surface 12 and the second side surface 22 is sufficiently large, sufficient deformation may not occur. Thus, a distance between the first side surface 12 and the second side surface 22 has to be sufficiently short so that the gasket 30 is sufficiently deformed to be fitted into and fixed to the vent hole 10, and the negative pressure to be applied may be sufficiently high. That is, when a negative pressure may be applied due to the Bernoulli's theorem, in which a flow velocity of a fluid increases, but an inner pressure decreases when the fluid flowing through a wider cross-section flows through a narrower cross-section, so that air flows, a pressure between the first side surface 12 and the second side surface 22 is relatively lower than that of each of other points. Thus, since the first can 10 and the second can 20 are in a fixed state, a pressure is applied to the gasket 30 in a direction in which the gasket 30 is inserted into the vent hole 23 (a direction in which the first can 10 and the second can 20 are in close contact with each other) to cause the deformation. For reference, when a plurality of the vent holes 23 are provided, it may be preferable that the negative pressure is applied to a corresponding vent hole 23 while the rest of the vent holes are blocked (through a separate mechanism or the like) to prevent pressure leakage from occurring in the rest of the vent holes.

Figure 4B:
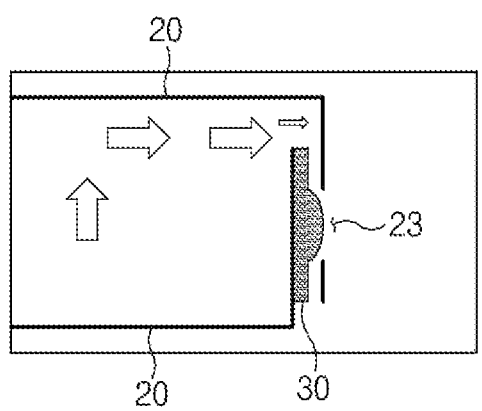
FIG. 4b is a cross-sectional view illustrating a state in which the gasket has a thickness greater than that of each of other regions at a region to be deformed when the negative pressure is applied.

Furthermore, when the distance between the first side surface 12 and the second side surface 22 increases due to a problem in the manufacturing process or other reasons, as illustrated in FIG. 4b, a portion of the gasket 30 may protrude toward the vent hole 23 (so that the distance between the first side surface and the second side surface decreases to cause the concentration of the negative pressure). That is, a portion of the gasket 30 may be manufactured to be thicker according to the distance between the first side surface 12 and the second side surface 22, the magnitude of the negative pressure, the size of the vent hole 23, or the like.

In conclusion, in the manufacturing method according to an embodiment of the present invention, the movement of the first can 10 and the second can 20 may be interrupted (temporarily before being fixed by the gasket) before the negative pressure is applied and thus be in a temporarily fixed state. Here, the material of the first can 10, the adhesion between the first can 10 and the gasket 30, the thickness of the gasket 30, and the like may be differently designed according to the sizes of the first can 10 and the second can 20, the magnitude of the negative pressure, and the like.

Also, the elastically or plastically deformed gasket 30 has to be maintained in the fitted state but does not need to protrude from the vent hole (so as to maintain a smooth outer surface). Also, even if a portion of the gasket 30 protrudes, the protruding portion may be cut to maintain the smooth outer surface, and an adhesive or the like may be additionally applied in the protruding state in order to increase in fixing force (so that the deformed portion of the gasket is firmly fixed to the second can).

As described above, in the punch step, a plurality of vent holes 23 are punched along a circumference of the side surface 22 of the second can 20. That is, as illustrated in FIG. 5, the vent holes may be provided in pairs in directions facing each other (see FIGS. 5I, 5ii, and 5iii) or may be concentrated to one side to increase the coupling force in a specific direction (see FIGS. 5iv and 5v).

According to the present invention having the configuration as described above, since the coupling point of the first can 10 and the second can 20 moves from the upper side to the side surface of the battery, the height of the internal space relative to the total height may increase, and thus, the electrode assembly having the larger capacity may be mounted. Also, since the gasket 30 is deformed to be fitted into the vent hole 23 so as to fix the first can 10 and the second can 20, each of the first can 10 and the second can 20 may have the smooth outer surface.

Also, since the gasket 30 is deformed to a size corresponding to the difference between the pressure inside the space defined by the first can 10 and the second can 20 and the pressure outside the first can 10 and the second can 20, the physical pressure causing the stress and/or the unnecessary deformation may not be applied to the first can 10 and the second can 20. Also, since at least two or more vent holes 23 are formed, the coupling force may be adjusted according to the required specification.

Also, in the state in which the partial region of the gasket 30 to be deformed is attached with adhesive force lower than that of each of other regions or is not attached, the negative pressure may be applied to prevent the side surface 12 of the first can 10 from being deformed. Also, the partial region of the gasket 30 to be deformed may have a thickness greater than that of each of other regions and thus may be more easily deformed.

While the embodiments of the present invention have been described with reference to the specific embodiments, it will be apparent to those skilled in the art that various changes and modifications may be made without departing from the spirit and scope of the invention as defined in the following claims.

The invention claimed is:
1. A secondary battery comprising:
a first can having a first side surface extending vertically from a first base surface along a circumference of the first base surface;
a second can having a second base surface with a diameter greater than that of the first base surface of the first can, the second can having a second side surface extending vertically from the second base surface, wherein the second side surface has a vent hole therein; and
a gasket disposed between the first side surface and the second side surface when the first can and the second can are coupled to each other,
wherein the first can and the second can are coupled to each other with the first side surface being inserted inside the second side surface, and wherein the gasket is deformed so as to extend into the vent hole, thereby fixing the first can and the second can.

2. The secondary battery of claim 1, wherein the first side surface of the first can is arranged along an upper side of the first base surface, and the second side surface of the second can is arranged along a lower side of the second base surface so that the second can covers the upper side of the first can when the first and second cans are coupled to each other.

3. The secondary battery of claim 1, wherein the gasket is deformed to a size corresponding to a difference between a pressure inside a space defined by the first and second cans and a pressure outside the first and second cans.

4. The secondary battery of claim 1, wherein the second side surface of the second can has a plurality of the vent holes defined along a circumference thereof.

5. The secondary battery of claim 4, wherein the second can has a circular plate-like shape, and
the vent holes are arranged in pairs that are symmetric with one another across a center of the circular plate-like shape.

6. The secondary battery of claim 4, wherein the second can has a circular plate-like shape, and
the vent holes are arranged so as to be denser in a specific region about a circumference of the circular plate-like shape than other regions about the circumference of the circular plate-like shape.

7. A method for manufacturing a secondary battery, comprising:
a step of providing a first can having a first side surface extending vertically from a first base surface along a circumference of the first base surface;
a step of providing a second can having a second base surface with a diameter greater than that of the first base surface of the first can, the second can having a second side surface extending vertically from the second base surface;
a punching step in which a vent hole is punched in the second side surface of the second can;
a coupling step in which the first can and the second can are coupled with a gasket disposed between the first side surface of the first can and the second side surface of the second can, the gasket facing the vent hole; and
a fixing step in which the first can and the second can are fixed together by deforming the gasket so as to extend into the vent hole.

8. The method of claim 7, wherein, in the fixing step, a negative pressure is applied to the vent hole from outside of the gasket to deform the gasket to extend into the vent hole.

9. The method of claim 8, further comprising a temporarily fixing step in which the first can and the second can are fixed before the negative pressure is applied to the vent hole.

10. The method of claim 8, wherein the negative pressure is applied when the gasket is attached to the first side surface of the first can.

11. The method of claim 10, wherein the negative pressure is applied when a portion of the gasket to be deformed is either not attached to the first side surface or is attached to the first side surface with an adhesion force lower than that of other portions of the gasket.

12. The method of claim 10, wherein a portion of the gasket to be deformed has a thickness different from that of each of other portions of the gasket.

13. The method of claim 7, wherein, in the punching step, a plurality of the vent holes are formed along a circumference of the second side surface of the second can.

* * * * *